(12) United States Patent
Kobayashi

(10) Patent No.: US 9,225,713 B2
(45) Date of Patent: Dec. 29, 2015

(54) SYSTEM, CONTROL METHOD, AND STORAGE MEDIUM

(71) Applicant: CANON KABUSHIKI KAISHA, Tokyo (JP)

(72) Inventor: Makoto Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 180 days.

(21) Appl. No.: 13/905,033

(22) Filed: May 29, 2013

(65) Prior Publication Data

US 2013/0340062 A1     Dec. 19, 2013

(30) Foreign Application Priority Data

Jun. 1, 2012   (JP) ................................. 2012-126189

(51) Int. Cl.
*H04L 29/06* (2006.01)

(52) U.S. Cl.
CPC .................................. *H04L 63/0815* (2013.01)

(58) Field of Classification Search
CPC ............ H04L 63/0815; H04L 63/0823; H04L 63/083; H04L 63/0884; G06F 21/41
See application file for complete search history.

(56) References Cited

U.S. PATENT DOCUMENTS

2013/0318590 A1* 11/2013 Matsugashita .................... 726/8

FOREIGN PATENT DOCUMENTS

JP          2004-234329 A      8/2004

* cited by examiner

*Primary Examiner* — Eleni Shiferaw
*Assistant Examiner* — Paul Callahan
(74) *Attorney, Agent, or Firm* — Canon USA Inc., IP Division

(57) ABSTRACT

The present invention performs control to realize an appropriate access by executing mapping processing of single sign-on by associating SP side user information and IdP side user information using a unique AUID.

9 Claims, 13 Drawing Sheets

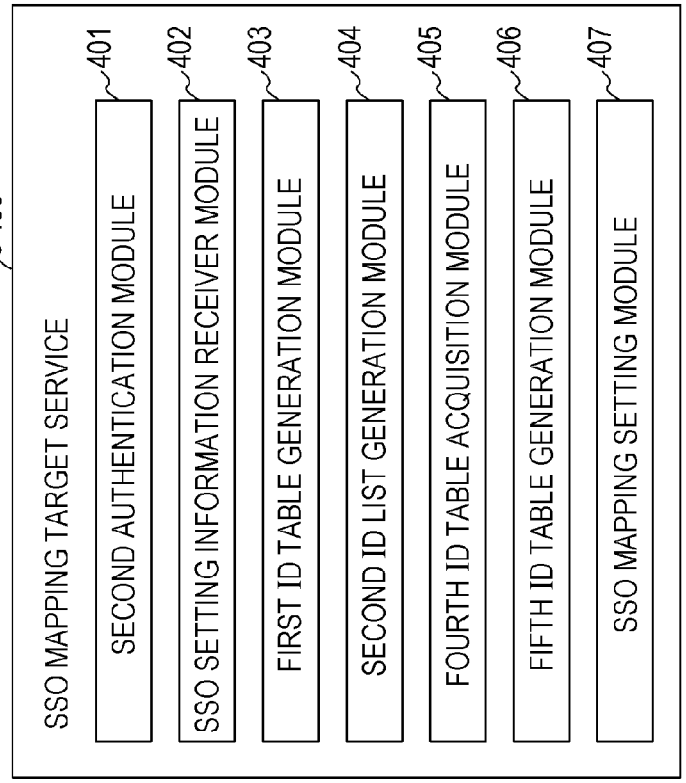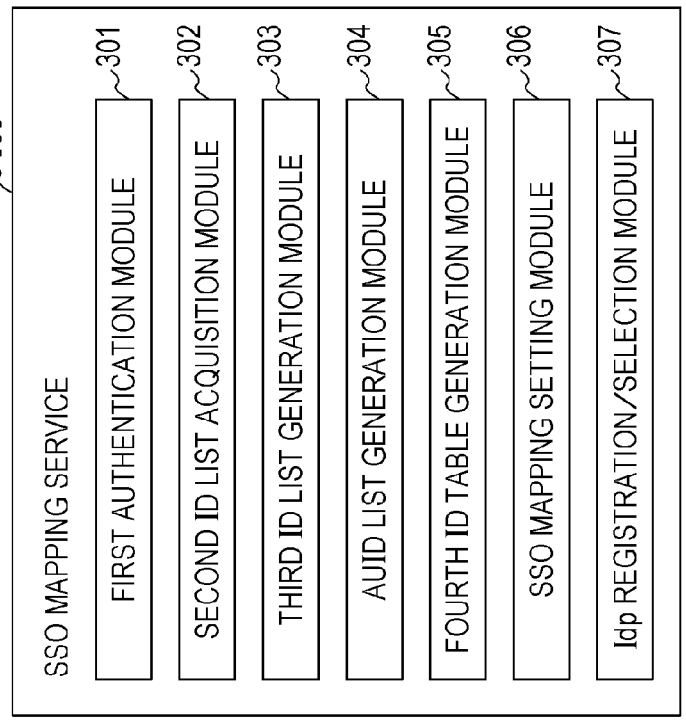

FIG. 5A-1

| | ~450 |
|---|---|
| Tenant_B | SP User1 |
| Tenant_B | SP User2 |
| Tenant_B | SP User3 |

FIG. 5A-2

| ~600 |
|---|
| SP User1 |
| SP User2 |
| SP User3 |

FIG. 5B-1

| | ~350 |
|---|---|
| Tenant_A | IdP User1 |
| Tenant_A | IdP User2 |
| Tenant_A | IdP User3 |
| Tenant_C | IdP User4 |

FIG. 5B-2

| | ~500 |
|---|---|
| IdP User1 | SP User1 |
| IdP User2 | SP User2 |
| IdP User3 | SP User3 |

FIG. 5B-3

| ~550 |
|---|
| SP User1 |
| SP User2 |
| SP User3 |

FIG. 6A

| | ~601 |
|---|---|
| SP User1 | AUID 1 |
| SP User2 | AUID 2 |
| SP User3 | AUID 3 |

FIG. 6B

| | ~602 |
|---|---|
| IdP User1 | AUID 1 |
| IdP User2 | AUID 2 |
| IdP User3 | AUID 3 |

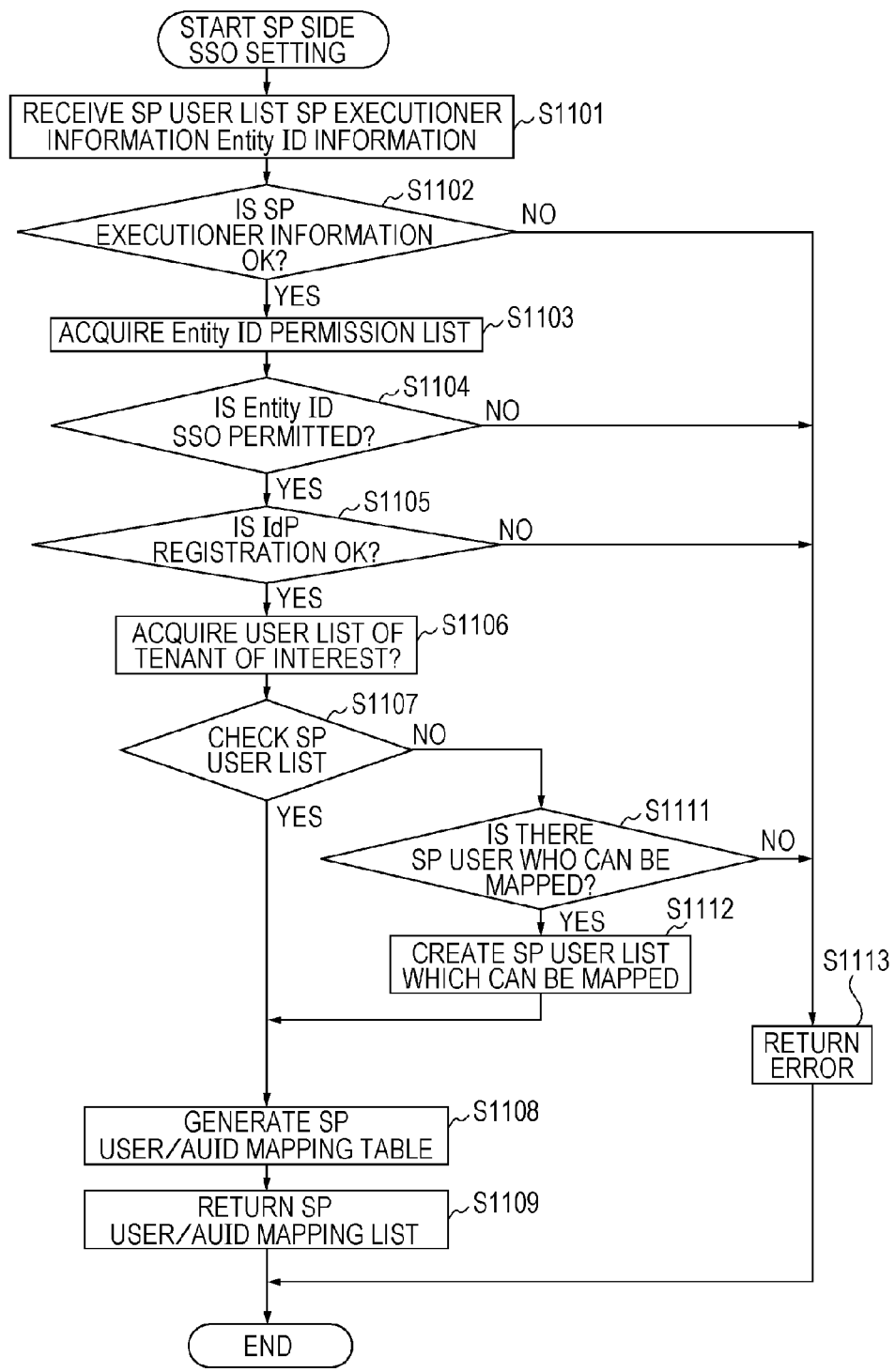

FIG. 9

SSO MAPPING COLLECTIVE SETTING PAGE

SP USER ID

SP PASSWORD

SET FILE    [REFERENCE]

[SET]

FIG. 10A

| TENANT A | IdP_A |
|---|---|
| TENANT B | |

FIG. 10B

| IdP_A |
|---|
| IdP_B |

SYSTEM, CONTROL METHOD, AND STORAGE MEDIUM

BACKGROUND OF THE INVENTION

1. Field of the Invention

The present invention relates to a setting method of single sign-on mapping which realizes single sign-on between services which support multiple tenants.

2. Description of the Related Art

Conventionally, a mechanism of single sign-on (referred to as "SSO" below) based on a Security Assertion Markup Language (referred to as "SAML" below) is known as a technique of cooperating user authentication between a plurality of servers under different domains. A system which realizes the SAML includes a server group (Identity Provider which is referred to as an "IdP" below) which provides an authenticating function. Further, the system which realizes the SAML also includes a server group (Service Provider which is referred to as an "SP" below) which is configured with at least one or more servers which provide a function by trusting an authentication result of the IdP. A user who utilizes the SSO based on the SAML registers authentication information such as user IDs of respective domains of the above IdP and SP.

For example, the user is authenticated by an ID provider based on user authentication information such as a user ID and a password managed by the IdP.

When the user is provided with a function of the SP, the user needs to access the IdP and be authenticated. For example, the user is authenticated by the IdP using the user ID and the password managed by the IdP. Further, the IdP issues to the authenticated user a SAML assertion which is a certificate of authentication for the SP. The SP authenticates the user by verifying whether this SAML assertion is issued by the trusted IdP. In this case, the user can enjoy services provided by the server group which cooperates with the SP, without inputting authentication information managed by the SP.

As described above, SSO based on the SAML depends on a trust relationship between the IdP and the SP. Hence, before SSO is realized, an ID provider and a service provider need to have a trust relationship in advance. This trust relationship is established by trading meta data which describes which function of a plurality of functions of the SAML performs SSO, and an electronic certificate which certifies that an assertion is issued by an ID provider. Specific contents of the meta data and a technique related to establishment of this trust relationship are defined by SAML V2.0 which is a standard technology. Meta data and Information such as an electronic certificate for verifying an assertion are referred to as "prior information". The service provider performs verification using the prior information when verifying whether the assertion satisfies the requirements. Further, the prior information is generally data issued by an ID provider.

In addition, when the user accesses the SP by way of SSO, a user ID for the SP is not passed to the SP as described above. More specifically, when the user first accesses the SP, this access is redirected to the IdP. Further, the user accesses the SP by using a SAML assertion issued when logging in the IdP. Meanwhile, an SP ID for accessing the SP by using an IdP ID included in the SAML assertion or information corresponding to the IdP ID is specified. To specify the SP ID from the IdP ID included in this SAML assertion or information corresponding to the IdP ID, a mapping table which indicates a correspondence relationship between the IdP ID or information corresponding to the IdP ID and the SP ID is required. In addition, creating this mapping table is referred to as "single sign-on mapping" (referred to as "SSO mapping" below). To realize SSO, it is necessary to generate an adequate mapping table by SSO mapping.

Further, Japanese Patent Application Laid-Open No. 2004-234329 discloses an SSO technique of creating an SP ID in advance and keeping the ID without allocating the ID to a user. Further, Japanese Patent Application Laid-Open No. 2004-234329 discloses an SSO mapping server which, when succeeding authentication by passing an ID and a password to an IdP, allocates an account of the SP to the IdP ID. This system realizes SSO mapping if validity of a user can be checked by the IdP.

However, a conventional method has the following problem. That is, conventionally, it is not taken into account a case where a user ID is deleted after SSO mapping is performed once, and the same user ID is registered.

SUMMARY OF THE INVENTION

To solve the above problem, the present invention is a system which manages a plurality of pieces of user information, and which has: a receiver unit which receives user information from another system; and a transmitting unit which transmits a table which associates the received user information and unique identification information of the plurality of pieces of user information, and, when the other system succeeds user authentication, the system provides a function of the system without performing the user authentication in the system based on the unique identification information.

Further features of the present invention will become apparent from the following description of exemplary embodiments (with reference to the attached drawings).

BRIEF DESCRIPTION OF THE DRAWINGS

FIG. 4A-4B is a module block diagram according to the embodiment of the present invention.

FIG. 5A-1-5A-2 and FIG. 5B-1-5B-3 illustrates an example of a tenant specific user list data according to the embodiment of the present invention.

FIG. 6A-6B illustrates an example of first and second ID lists and SSO mapping setting information according to the embodiment of the present invention.

FIG. 7A-7B is a setting flow of SSO mapping according to the embodiment of the present invention.

FIG. 9 illustrates an example of a screen of an SSO mapping setting according to the embodiment of the present invention.

FIG. 10A-10B is a view of a correspondence relationship for realizing automatic registration of IdPs.

DESCRIPTION OF THE EMBODIMENTS

An object of the present invention is to make an SSO mapping setting of adequate IDs between services for which authentication needs to be cooperated. In addition, single sign-on according to the present invention enables to provide a system function without authenticating a user at a system when another system succeeds authentication of the user.

First, a current embodiment and a current problem will be described with reference to FIGS. 8A and 8B, and it will be described that the current problem will be solved using FIGS. 8C and 8D based on a specific example.

Figure 8A:
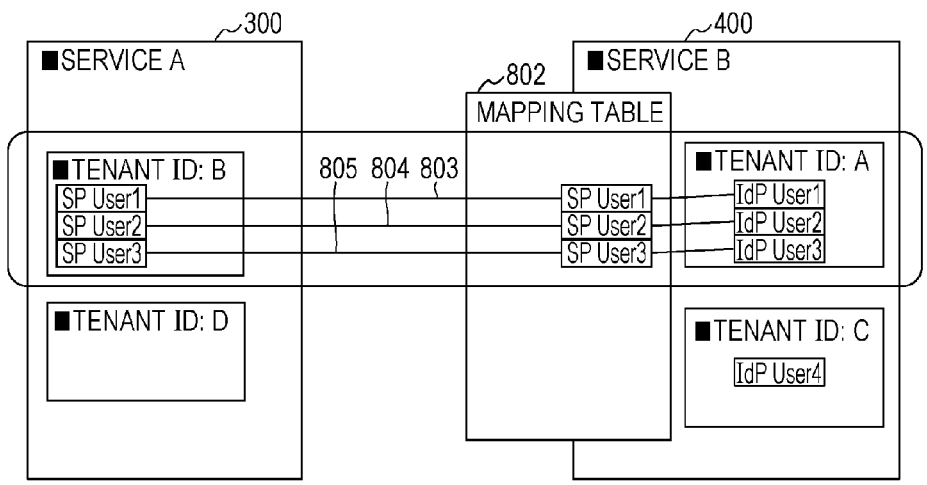
FIG. 8A-8D is a view of a setting status of SSO mapping according to the embodiment of the present invention.

FIG. 8A is a view illustrating a current SSO mapping setting status.

A service B 400 (IdP) which is an SSO mapping target service includes a tenant A and a tenant C, and the tenant A includes IdP User 1 to 3 as user IDs. Further, the tenant C includes IdP User 4 as a user ID.

A service A 300 (SP) which is an SSO mapping service includes a tenant B and a tenant D, and the tenant B includes SP User 1 to 3 as user IDs. Further, the tenant D does not include any user ID.

Figure 8B:
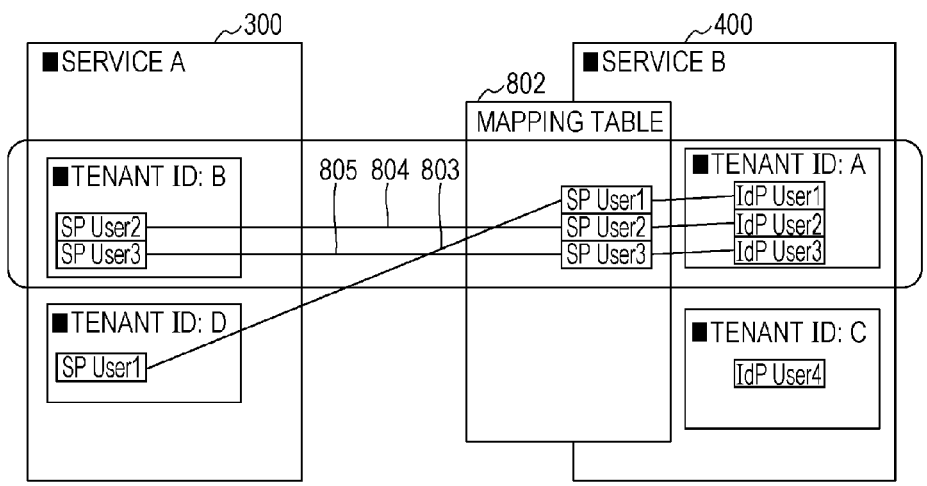

Meanwhile, FIG. 8B illustrates a status in which SP User 1 of the tenant ID B of the SSO mapping service A 300 is deleted from the status in FIG. 8A and the same user SP User 1 is created for the tenant ID D without with reference to processing according to the present invention.

The status in FIG. 8B is a status in which IdP User 1 can perform SSO to the tenant ID D. That is, in the status in FIG. 8A, there is a problem that, even though it is designated that IdP User 1 uses the tenant ID B, the IdP User 1 accesses a tenant different from the original designation by way of SSO.

Next, it will be described that the above problem will be solved by using an AUID with reference to FIGS. 8C to 8D.

Figure 8C:
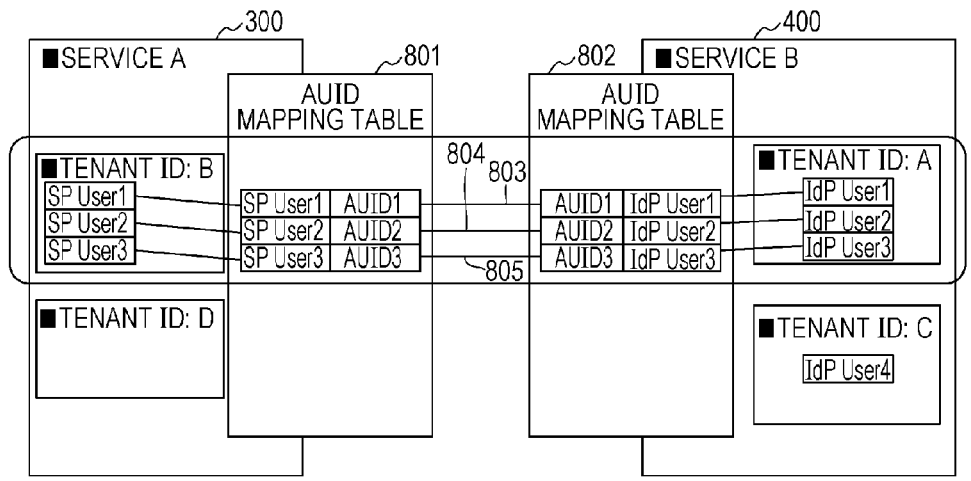

FIG. 8(c) is a view illustrating an SSO mapping setting status according to an embodiment of the present invention.

A service B 400 (IdP) which is an SSO mapping target service includes a tenant A and a tenant C, and the tenant A includes IdP User 1 to 3 as user IDs. Further, the tenant C includes IdP User 4 as a user ID.

A service A 300 (SP) which is an SSO mapping service includes a tenant B and a tenant D, and the tenant B includes SP User 1 to 3 as user IDs. Further, the tenant D does not include any user ID.

Figure 7A:
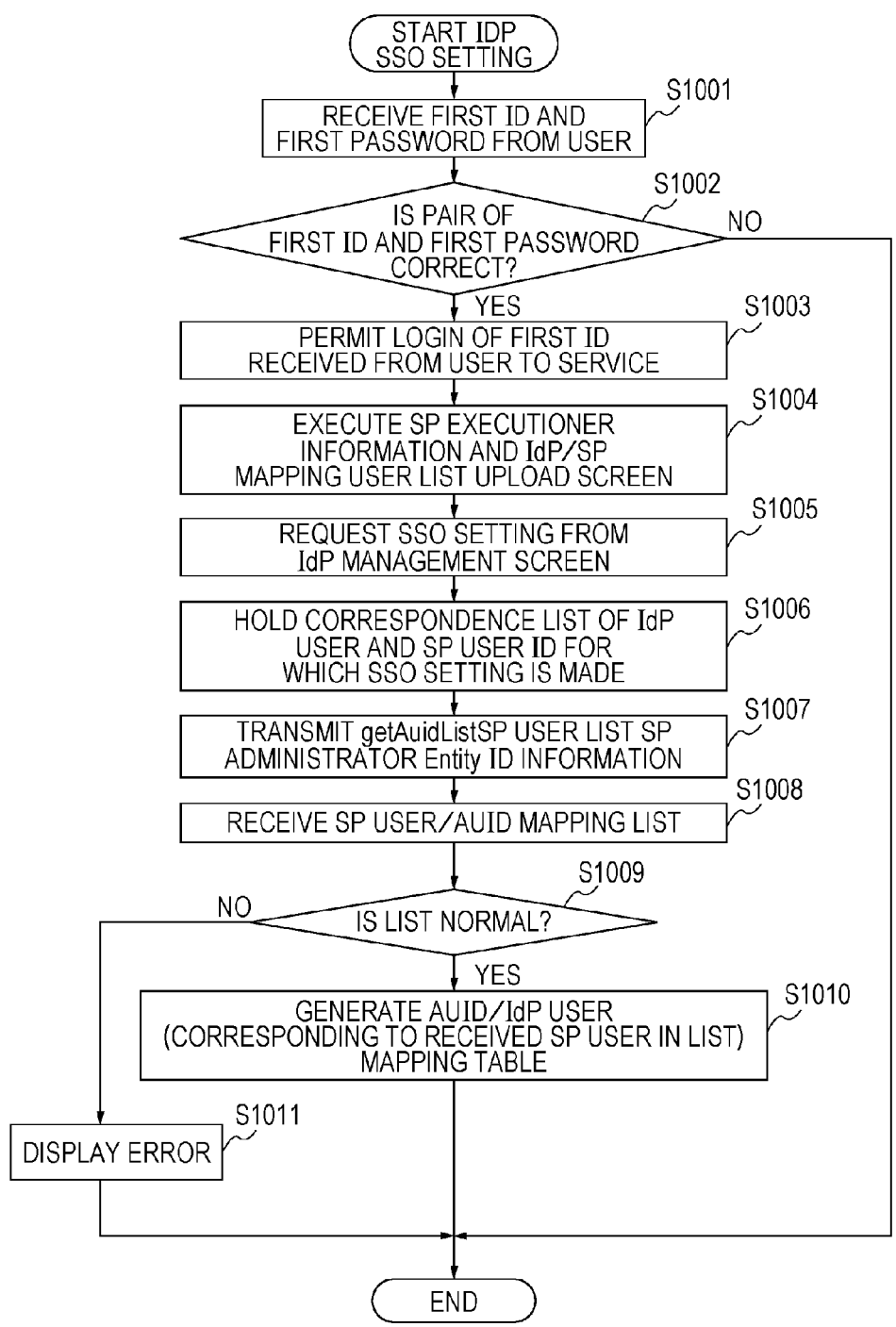

Here, by performing a flow in FIG. 7A-7B, an SSO mapping setting is executed between IdP User 1 and SP User 1. Further, the SSO mapping setting is also executed between IdP User 2 and SP User 2 and between IdP User 3 and SP User 3. According to this mapping, a fourth ID table and a fifth ID table are set to an AUID mapping table 801 and an AUID mapping table 802, respectively, so that an adequate SSO mapping setting is made.

Figure 8D:
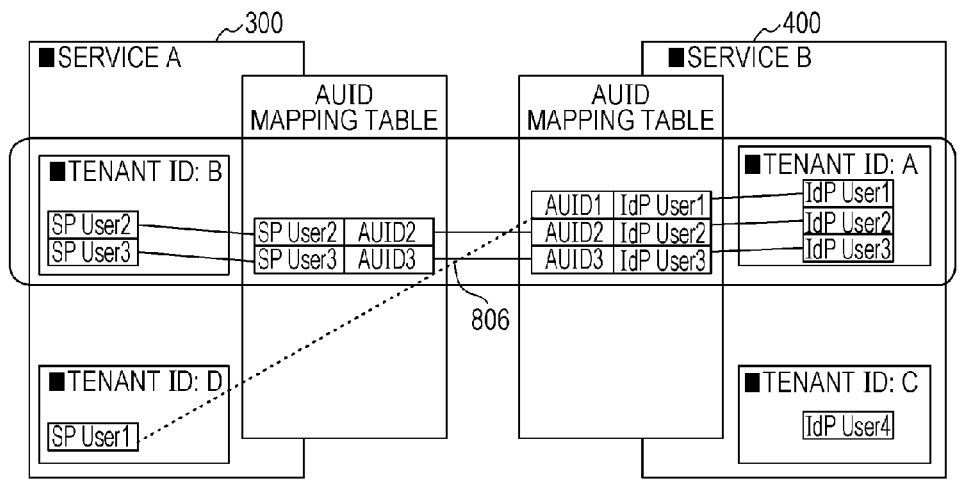

FIG. 8D is a view illustrating an SSO mapping setting status according to an embodiment of the present invention when the status in FIG. 8C changes.

SP User 1 of the tenant ID B of the SSO mapping service A 300 is deleted from the status in FIG. 8C, and the same user SP User 1 is created from the tenant ID D. That is, the same operation as that in FIG. 8B was performed.

In case of the present embodiment, the mapping state is also deleted following deletion of the user ID, and then SP User 1 and AUID 1 are deleted from the AUID mapping table 801 of the SSO mapping service A 300. Hence, even if, for example, the same user SP User 1 is recreated for the tenant ID D, there is no relationship like the SSO mapping 806. That is, it is possible to prevent occurrence of the problem described with reference to FIGS. 8A and 8B. Hence, when SSO mapping is set according to the flow illustrated in FIG. 7A-7B, the SSO mapping service A 300 deletes a user ID. Further, even when an operation which is directed to recreating the same user ID for another tenant and which is not noticed by an SSO mapping target service B side is executed, it is possible to prevent unintended SSO.

Hereinafter, the best mode for implementing the present invention will be described with reference to the drawings.

Figure 1:
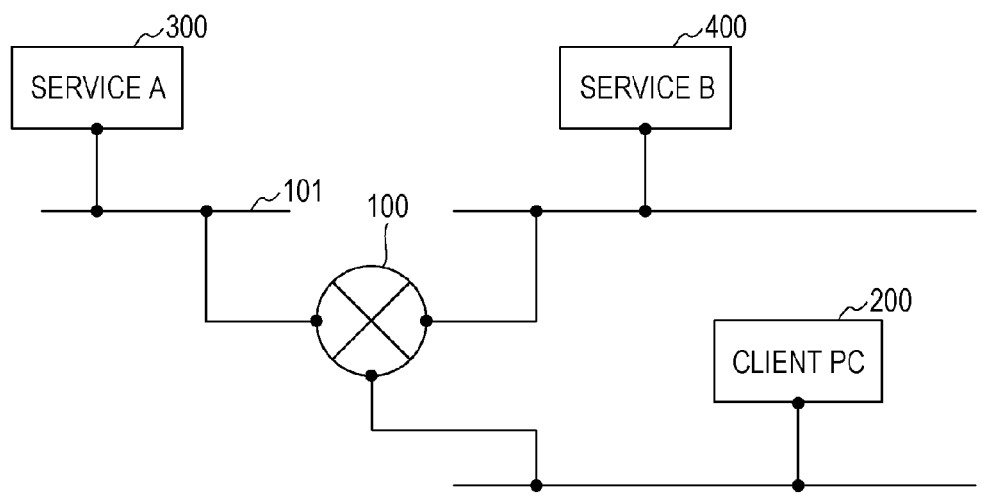
FIG. 1 is a view of a network configuration.

An authority transfer system according to the present embodiment is realized on a network employing a configuration illustrated in FIG. 1.

According to the present invention, the world wide web (WWW) system is constructed on a wide area network 100 (WAN 100). A local area network 101 (LAN 101) connects each component.

A user operates a client PC 200, and the service A 300 and the service B 400 provides services (functions) when the user is authenticated. In addition, the services (functions) provided by the service A and the service B are a printing function and a business form function. The business form function is a function of creating a business form by executing overlay processing by holding a template at the SP and using content data received from an IdP and a template held at the SP.

Further, the client PC 200, the service A 300 and the service B 400 are connected through the WAN network 100 and the LAN 101. In addition, the client PC 200 and respective services may be configured on individual LANs or may be configured on a single LAN. Further, the client PC 200 and respective services may be configured on a single PC. The service A 300 and the service B 400 operate on a server group A 300 and a server group B 400, respectively. The server group A and the server group B are configured by authentication servers and servers which provide services. The server groups A and B are configured by, for example, authentication servers and servers which provide services. The authentication server and the server which provides a service may be configured by one server or may be configured by a plurality of servers. In addition, in this description, although the server group A is referred to as an "SP", and the server group B is referred to as an "IdP", these may be reversed. The service B 400 first receives login of a user. Next, when receiving an SSO mapping setting request from a user, the service B generates a first ID table. In addition, the SSO mapping setting request is issued when the user pushes a setting button in FIG. 9 described below.

The first ID table is configured by a list of tuples of user IDs of the service A 300 as an SSO mapping target and user IDs of the service B 400 associated with the user IDs of the service A 300. In addition, at a stage at which a user who uses the service B 400 (IdP) requests use of the service A 300 (SP), the service B 400 (IdP) can acquire the user ID of the service A 300. This is an example, and a user ID of an SP only needs to be acquired before the first ID table is created.

In addition, FIG. 5B-2 described below illustrates an example of the first ID table. Further, the service B 400 generates a second ID list as an SSO mapping setting request. The second ID list is configured by a user ID list of the service A 300 which is an SSO mapping setting request target in the first ID table. In addition, FIG. 5B-3 described below illustrates an example of the second ID list. The service B 400 transmits to the service A 300 the second ID list and information such as SSO mapping executioner information of the service A 300 and entity information of the service B 400 in the service A 300 required for SSO mapping. In addition, the SSO mapping executioner information of the service A 300 is information designated by the user ID of the SP in FIG. 9 described below.

Here, the entity information is defined according to a SAML protocol, and, for the SP, the IdP is identified according to an ID which is referred to as an "entity ID". This entity ID is described in meta data which was traded in advance. As server groups which provide an authentication function, some IdPs are systems which have single entity IDs, and some IdPs are systems which can have a plurality of entity IDs. The service B 400 as an IdP has a single entity ID, and can acquire the entity ID as entity information from an entity ID acquisition means. Naturally, the service B may have a plurality of entity IDs.

Meanwhile, the service A 300 receives from the service B 400 the second ID list which is the user ID list of the service A 300 which is an SSO mapping setting request target. In this case, the service A 300 receives the SSO mapping executioner information of the service A 300 and the entity information of the service B 400 in the service A 300, together with the second ID list. The service A 300 checks a registered entity from the entity information of the service B 400 among the received information, determines an SSO mapping executioner from the SSO mapping executioner information of the service A 300 and acquires a third user ID list which the SSO mapping executioner can acquire. The service A 300 checks that each user in the acquired second ID list is included in the third user ID list. The service A 300 dynamically generates an AUID (Account Unique Identifier) list associated with each user in the second ID list. The AUID is a unique universally unique identifier (UUID). The service A 300 generates a fourth ID table. The fourth ID table is configured by tuples of the second ID list and a list of the AUIDs associated with the respective user IDs in the second ID list. The service A 300 returns the fourth ID table in response to the SSO mapping setting request of the service B 400. The service A 300 performs SSO mapping using the fourth ID table.

The service B 400 receives the fourth ID table transmitted from the service A 300. The service B 400 compares the received fourth ID table and the stored first ID table, and generates a fifth ID table. The fifth ID table is configured by a list of tuples of AUIDs associated with the respective IDs in the second ID list transmitted to the service A 300 in response to the SSO mapping setting request. The service A 300 performs SSO mapping using the fifth ID table.

The service A 300 and the service B 400 each operate on a server computer described below.

Hereinafter, a relationship between the IdP and the SP will be described.

For example, the SAML is realized by HTTP, and an end point is defined according to a URL. The end point refers to an address of an IdP. Further, while an electronic certificate which differs from one Entity ID to another is required to sign an assertion, the electronic certificate is issued being liked to a host name. As a result, the IdP has a host name which differs from one Entity ID to another in order to have a plurality of Entity IDs. In addition, each host name enables host name solution, and needs to be associated with an IP address as a result of host name solution. When the IdP dynamically adds an Entity ID in response to a user's request, the IdP needs to have a DNS server and performs an operation of registering a new host name and an IP address in the DNS server following addition of the Entity ID. Hence, the IdP has a difficulty in having a plurality of Entity IDs if the IdP does not have a relatively large scale.

In a case where a service is provided to a third party such as an application service provider, user friendliness may be improved by restricting the third party's access to a specific URL. In such a case, the URL is single and the Entity ID is single.

As described above, it varies depending on a configuration of the IdP whether the number of Entity IDs is single or plural. As in the present embodiment, the IdP has only a single entity ID.

Figure 2:
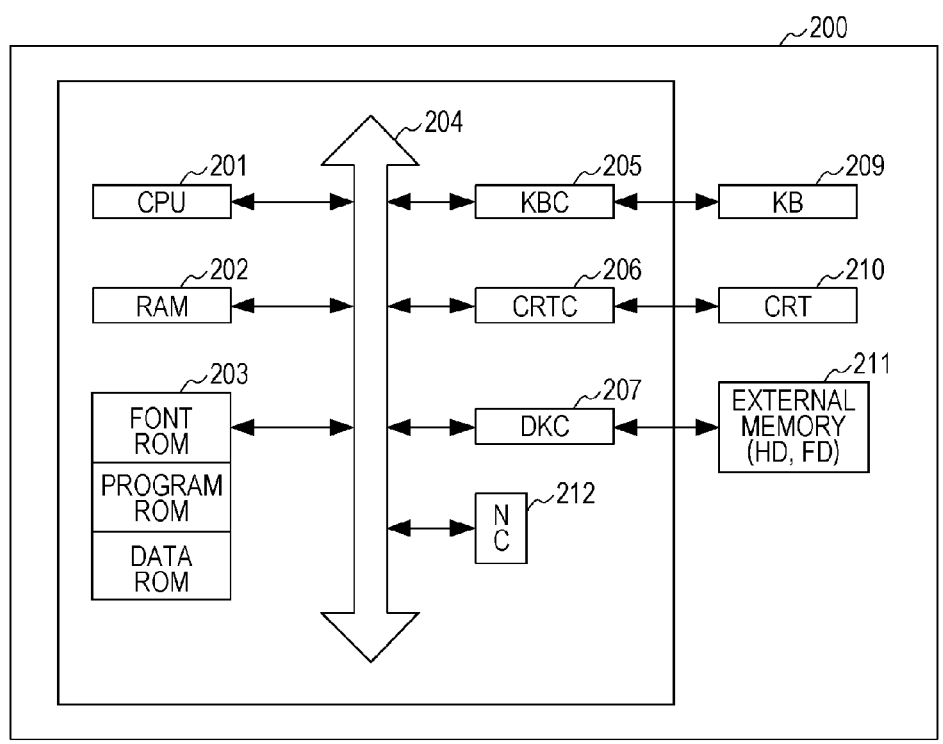
FIG. 2 is a block diagram of a PC according to an embodiment of the present invention.

FIG. 2 illustrates a configuration of the client PC 200 according to the present embodiment. Further, the configuration of a server computer which provides the service A 300 and the service B 400 is also the same. In addition, a hardware block diagram illustrated in FIG. 2 corresponds to a hardware block diagram of a general information processing apparatus, and a hardware configuration of a general information processing apparatus is applicable to the client PC 200 and the server computer according to the present embodiment.

In FIG. 2, a CPU 201 executes programs such as an OS and an application which are stored in a program ROM of a ROM 203 or loaded to a RAM 202 from a hard disk 211. Hereinafter, the term OS is an abbreviation of an operating system which operates on a computer, and the operating system will be referred to as an "OS" below. Processing in each flowchart described below can be realized by executing this program. The RAM 202 functions as a main memory and a work area of the CPU 201. A keyboard controller (KBC) 205 controls a key input from a keyboard (KB) 209 and a pointing device which is not illustrated. A CRT controller (CRTC) 206 controls display of a CRT display 210. A disk controller (DKC) 207 controls a data access to a hard disk (HD) 211 or a floppy (registered trademark) disk (FD) which stores various items of data. An NC 212 is connected to the network, and executes communication control processing with other devices connected with the network.

In addition, a main entity for execution on the hardware is the CPU 201 in the following entire description unless otherwise mentioned, and a main entity on software is an application program installed in the hard disk (HD) 211. For example, each step in the flowcharts according to the present invention is realized when the CPU reads and executes a program related to the flowchart.

Figure 3A:
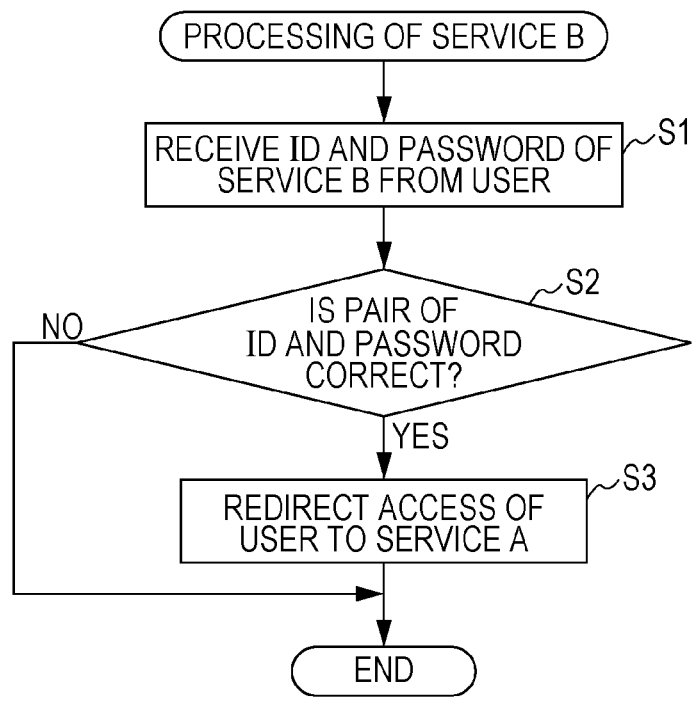
FIG. 3A-3B is a general login flow which uses an SSO mapping setting.
Figure 3B:
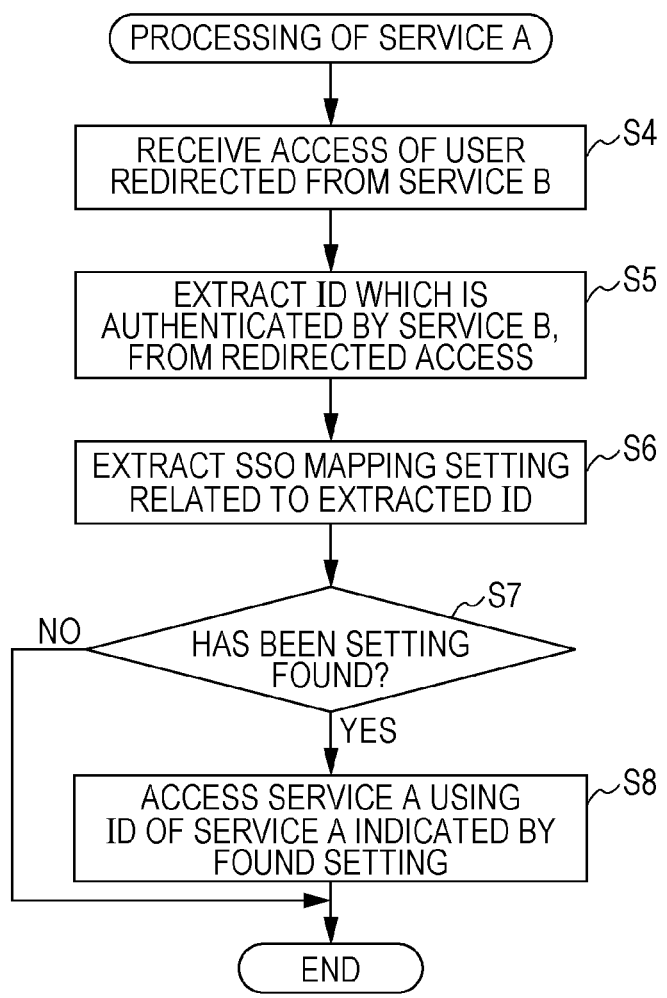

FIG. 3A-3B is a login flow of general SSO which uses an SSO mapping setting. Hereinafter, an example will be described where the service B 400 operates as an IdP and the service A 300 operates as an SP. In addition, the service A 300 may be an IdP, and the service B 400 may be an SP.

In a case where the service B 400 is an IdP, when authenticated by the service B 400, the user can enjoy a service provided by the service A 300.

In the following example, a flow will be described in the case where a user is first authenticated by the service B 400, and then enjoys the service of the service A 300 by way of SSO. In addition, the flow may go in such a manner that the user accesses the service A 300, then is redirected to the service B 400, is authenticated by the service B 400 and then enjoys the service of service A 300.

FIG. 3A is an SSO login flow on an IdP side, wherein the service B 400 is an IdP.

In step S1, the service B 400 receives a user authentication request from a user who desires to enjoy the service of the service A 300. Here, the service B 400 receives an ID and a password of the service B from the user to be authenticated by the service B.

In step S2, the service B 400 checks whether a combination of the ID and the password of the service B received from the user in step S1 is correct (executes user authentication). The service B 400 holds adequate combinations of the IDs and passwords, and realizes processing in step S1 depending on whether the combination received in step S1 is held as an adequate combination. When the combination is correct, the flowchart transitions to step S3. Further, when the combination is not correct, the flowchart is finished.

In step S3, the service B 400 executes user authentication, and redirects an access from the user to the service A 300. Further, in this case, the redirected access and an ID of the user authenticated by the service B 400 (or information corresponding to the ID of the user authenticated by the service B) are transmitted. When the service B 400 finishes redirection, the flowchart is finished. In addition, processing in step S3 is executed when the user selects to use a service of the SP using a UI on the IdP side after it is decided in step S2 that a pair of the ID and the password is decided to be correct.

FIG. 3B is a general SSO login flow on an SP side, wherein the service A 300 is an SP.

In step S4, the service A 300 receives a user's access redirected from the service B 400.

In step S5, the service A 300 extracts the ID of the user authenticated by the service B.

In step S6, the service A 300 extracts a mapping table which is related to the user ID extracted in step S5 and which is generated by SSO mapping.

In step S7, the service A 300 decides whether an SSO mapping setting is found in step S6. If found, the flowchart transitions to step S8, and, if not, the flowchart is finished.

In step S8, the service A 300 executes user authentication using the ID of the service A indicated by the SSO mapping setting found in step S6. Further, the service A 300 permits the access received in step S4 and provides the service, and then the flowchart is finished.

As described above, if SSO mapping is set, the user can enjoy the service provided by the service A 300 by passing the ID and the password of the service B 400 only to the service B 400.

FIG. 4A-4B is a module block diagram according to the embodiment of the present invention. In addition, although the service A 300 is an SSO mapping service and the service B 400 is an SSO mapping target service, a correspondence relationship between services is not limited to the above relationship. In addition, as described above, each module illustrated in FIG. 4A-4B is stored in the HDD, and is realized by being loaded to the memory and executed by the CPU.

FIG. 4A is a module block diagram of the SSO mapping service 300 according to the embodiment of the present invention. In addition, the SP has the modules of the SSO mapping service 300. The SSO mapping service 300 has a first authentication module 301, a second ID list acquisition module 302, a third ID list generation module 303, an AUID list generation module 304, a fourth ID table generation module 305, an SSO mapping setting module 306 and an IdP registration/selection module 307. The SSO mapping setting module 306 has an API which returns a fourth ID table in response to an SSO mapping ID table generation request for generating a mapping table required to realize SSO. The SSO mapping setting module 306 receives the second ID list from the SSO mapping target service 400. Further, a third ID list is generated as a list of IDs which can be acquired by the authority of the user authenticated by the first authentication module 301 using the third ID list generation module 303. The SSO mapping target user ID list included in the second ID list in the third ID list is generated. An SSO mapping setting file 500 which is a fourth ID table associated with AUIDs dynamically generated for respective IDs of the SSO mapping target user ID list is generated, and the SSO mapping service makes the SSO mapping setting and returns the fourth ID table. The IdP registration/selection module 307 registers the SSO mapping target service 400 as an IdP of an SAML protocol. Further, in response to the SSO mapping setting request, the IdP registration/selection module 307 provides a function of enabling selection of currently effective IdPs, to a user who uses a plurality of IdPs as SP side users.

FIG. 4B is a module block diagram of the SSO mapping target service 400 according to the embodiment of the present invention. In addition, the IdP has modules of the SSO mapping target service. The SSO mapping target service 400 has a second authentication module 401, an SSO setting information receiver module 402, a first ID table generation module 403, a second ID list generation module 404, a fourth ID table acquisition module 405, a fifth ID table generation module 406 and an SSO mapping setting module 407. The SSO mapping setting module 407 issues an SSO mapping ID table generation request for SSO mapping. When acquiring the SSO mapping ID table for SSO mapping from the SSO mapping service 300, the SSO mapping setting module 407 generates the fifth ID table and makes the SSO mapping setting.

FIG. 5A-1-5A-2 and FIG. 5B-1-5B-3 illustrates an example of user list data which is an SSO mapping target according to the embodiment of the present invention. 450 in FIG. 5A-1 is an example of tenant- (group-) specific user list data managed by the SSO mapping service, and 350 in FIG. 5B-1 is an example of tenant-specific user list data managed by the SSO mapping target service. Here, the SSO mapping target service 400 includes two tenants of a Tenant A and a Tenant C. Further, a data is an example in the case where users IdP User 1 to 3 belongs to the Tenant A and a user IdP User 4 belongs to the Tenant C. Furthermore, data is an example in the case where the SSO mapping service 300 includes one tenant of the Tenant B, and users SP User 1 to 3 belongs to the Tenant B. Still further, 500 in FIG. 5B-2 illustrates an example of the first ID table generated by the first ID table generation module 403 in FIG. 4B. 550 in FIG. 5B-3 is an example of the second ID list generated by the second ID list generation module 404 in FIG. 4B. Further, 600 in FIG. 5A-2 is an example of the third ID list generated by the third ID list generation module 303 in FIG. 4A.

FIG. 6A-6B illustrates an example of the fourth and fifth ID tables according to the embodiment of the present invention. A fifth ID table 602 is an example of the fifth ID table generated by the fifth ID table generation module 406 described with reference to FIG. 4B. A fourth ID table 601 is an example of the fourth ID table generated by the fourth ID table generation module 305 described with reference to FIG. 4A.

FIG. 7A-7B is a flowchart of an SSO mapping setting according to the embodiment of the present invention. In addition, the SSO mapping setting refers to generation of A and B in FIG. 6A-6B. FIG. 7A illustrates a flowchart of IdP side SSO mapping, that is, the SSO mapping target service 400, and FIG. 7B illustrates a flowchart of SP side SSO mapping, that is, the SSO mapping service 300.

FIG. 7A is a flowchart illustrating a setting flow of SSO mapping of the SSO mapping target service 400 according to the embodiment of the present invention. This flowchart is started when the user who wants to create a mapping table of SSO mapping accesses the SSO mapping target service 400.

In step S1001, the second authentication module 401 receives a first ID and a first password for user authentication by the SSO mapping target service 400 from the user who accesses the SSO mapping target service 400. That is, the second authentication module 401 receives the ID and the password for the IdP.

In step S1002, the second authentication module 401 decides whether a combination of the first ID and the first password received in step S1001 is correct. If the combination is correct, the flowchart transitions to step S1003. Further, if the combination is not correct, the user's access is denied, and this flowchart is finished.

In step S1003, the second authentication module 401 permits login of the first ID received from the user, to the SSO mapping target service 400. In addition, the user ID is IdP User 1.

In step S1004, the SSO setting information receiver module 402 receives SSO mapping setting information from the user. The SSO mapping setting information is configured with an SP side user ID, a password associated with the SP side user ID and an SSO mapping information file. The SSO mapping information file is an information file describing a user ID which is a target of SSO mapping desired by the user, and is provided in a CSV, JSON or XML format. In addition, a screen which allows the user to input the SSO mapping setting information is as illustrated in, for example, FIG. 9, and, when the setting button is pushed, the SSO mapping setting information is uploaded. Here, a case will be considered where SSO mapping setting information 500 describes information for which the SSO mapping setting is made for each combination of IdP User 1 and SP User 1, IdP User 2 and SP User 2 and IdP User 3 and SP User 3. In the case of the present embodiment, the information is a CSV file and is the information as described below:
IdP User 1, SP User 1;
IdP User 2, SP User 2; and
IdP User 3, SP User 3.

The SSO mapping setting information in which this information is described is uploaded as illustrated in FIG. 9.

In step S1005, the SSO setting information receiver module 402 generates the first ID table 500 using the first ID table generation module 403 based on the SSO mapping setting information received in step S1004. Further, the SSO setting information receiver module 402 generates an SSO setting request ID list 550 (second ID list) which is an argument of an SSO setting request API with respect to the service 300 described below based on the first ID table 500. Furthermore, the SSO setting information receiver module 402 acquires an entity ID of the SSO mapping service B 400. In some cases, the entity ID is simply referred to as "specifying information".

In step S1006, the SSO setting information receiver module 402 temporarily stores the first ID table 500 generated in step S1005. The first ID table 500 stored here is used by the SSO mapping setting module 407 described below to generate a fifth ID table 602.

In step S1007, the SSO setting information receiver module 402 transmits the SSO mapping setting request to the service A 300 using the information collected in step S1004 and step S1005 as arguments. The information to be transmitted together with the SSO mapping setting request is SP executioner information (an SP user ID and an SP password), an SSO setting request ID list 550 and the entity ID of the service B 400.

Here, the SSO mapping target service 400 waits for the SSO mapping service 300 to respond to the SSO mapping setting request, that is, a fourth ID table generation request.

In step S1008, the SSO setting information receiver module 402 receives the fourth ID table 601 according to a processing result of the SSO mapping service 300 described below with reference to FIG. 7B.

In step S1009, the SSO setting information receiver module 402 makes decision on the received fourth ID table. In this decision, whether the SP users, SP User 1 to 3, included in the fourth ID table received in step S1008 are included in the first ID table 500 stored in step S1006. If the user of the IdP is not correct as a result of decision, processing is stopped, an error message is displayed in step S1011 (not illustrated), and then this flowchart is finished. If the decision result is normal, the flowchart transitions to next step S1010. For example, when SP User 1 and SP User 4 are included in the fourth ID table, processing is advanced for the SP User 1. However, SP User 4 is not included in the first ID table 500. Therefore, an error occurs.

In step S1010, the SSO setting information receiver module 402 generates a fifth ID table using the fifth ID table module 406. The fifth ID table is generated using the first ID table 500 stored in step S1006 and the fourth ID table 601 received in step S1008. The fifth ID table generation module 406 generates a fourth ID table 601 using the fourth ID table 601 received in step S1008 and the first ID table 500 stored in step S1006. More specifically, IdP User 1, IdP User 2 and IdP User 3 in the first ID table 500 associated with SP User 1, SP User 2 and SP User 3 in the fourth ID table 601 are extracted. Further, extracted IdP User 1, IdP User 2 and IdP User 3 are associated with AUID 1, AUID 2 and AUID 3 in the fourth ID table 601. According to the above processing, the SSO setting information receiver module 402 generates the fifth ID table 602, and makes the SSO mapping setting.

This SSO mapping setting is finished, and this flowchart is finished. In addition, in this SSO mapping setting, settings of AUIDs are also deleted following deletion or movement of the user ID. More specifically, when there are settings of IdP User 1 and AUID 1 on the AUID mapping table, the settings of IdP User 1 and AUID 1 are also deleted from the AUID mapping table following deletion of the IdP User 1.

As a result, even when, for example, SSO mapping is performed once, then the user ID is deleted and the same user ID is registered again, an AUID different from the user ID before deletion is issued to the re-registered user ID. Consequently, it is possible to realize adequate SSO.

Although the description has been made for the case where the processing in FIG. 7A is processed by one server, the processing in FIG. 7A may be realized using a system configured with a plurality of servers. When the system configured with a plurality of servers realizes the processing in FIG. 7A, each server has each module in FIG. 4A.

FIG. 7B is a flowchart according to the embodiment of the present invention in which the SSO mapping service 300 generates the fourth ID table. This flowchart starts when the SSO mapping service 300 receives a fourth ID list generation request from the SSO mapping target service 400 in step S1101. The fourth ID table generation request includes the SP user ID described in step S1007, the SP password, an SSO setting request ID list (second ID list) 550 and the entity ID of the service B 400.

In step S1102, the first authentication module 301 decides whether a combination of the SP user ID and the SP password included in the fourth ID list generation request is correct. When it is decided that the combination is correct, the flowchart transitions to step S1103, and, when it is decided that the combination is not correct, an error is returned in step S1114 without returning the fourth ID table to the SSO mapping target service 400, and this flowchart is finished. In addition, a tenant ID is specified by using these SP user ID and SP password.

In step S1103, the first authentication module acquires an entity ID list which has been already registered, by using the SSO mapping setting module 306 to determine the entity ID included in the fourth ID list generation request. SSO of the entity IDs registered in this entity ID list is permitted by the SSO mapping service 300. That is, it is set for each entity ID in the entity ID list whether SSO is permitted.

In step S1104, the first authentication module decides whether the entity ID included in the fourth ID list generation request is included in the entity ID list acquired in step S1103. When it is determined that the entity ID is included, the flowchart transitions to step S1105 and, when it is determined the entity ID is not included, an error is returned in step S1114 without returning the fourth ID table to the SSO mapping target service 400, and this flowchart is finished.

In step S1105, the IdP registration/selection module 307 checks an IdP registration status of the SP user included in the fourth ID list generation request. More specifically, the SP has a list in which IdPs are registered for respective tenant IDs. The SP refers to this list in step S1105, and decides whether the IdP is registered in a current target tenant ID. When the IdP is registered, processing in step S1105 is determined as Yes, and, when the IdP is not registered, the processing in step S1105 is determined as No.

In step S1106, the third ID list generation module generates a third ID list which indicates a list of IDs which can be acquired by an authority of a user (that is, SP executioner information) authenticated by the first authentication module 301. For example, FIG. 5A-2 of this application corresponds to the third ID list, and current SP executioner information indicates that information about the SP User 1 to 3 is acquired. Details will be further described. The third ID list generation module checks the authority of the SP executioner information (for example, an administrator or not), and specifies a tenant ID to which the SP executioner information belongs. Further, the third ID list is generated by acquiring IDs which can be acquired by the authority of the current SP executioner information from the ID list belonging to the specified tenant ID.

In step S1107, the SSO mapping setting module 306 acquires the SSO setting request ID list (second ID list) 550 included in the fourth ID table generation request using the second ID list acquisition module 302. In addition, the second ID list is also referred to simply as "user information".

Further, the SSO mapping setting module 306 compares the third ID list generated in step S1106 and the second ID list, and, when both match, the flowchart transitions to step S1108. If the lists do not match, the flowchart transitions to step S1111.

In step S1111, the SSO mapping setting module 306 checks whether users in the second ID list acquired in step S1107 are included in the third ID list. If the users in the second ID list are included in the third ID list, the flowchart transitions to step S1112. If no user in the second ID list is included in the third ID list, an error is returned in step S1114, and this flowchart is finished.

In step S1112, the SSO mapping setting module 306 picks up users included in the third ID list from the users included in the second ID list checked in step S1111. Further, the SSO mapping setting module 306 regenerates the second ID list, and the flowchart transitions to step S1108.

In step S1108, the SSO mapping setting module 306 performs SSO mapping processing of the second ID list. This SSO mapping processing is processing in which the fourth ID table generation module 305 sets an AUID to each user ID included in the second ID list.

In step S1109, the SSO mapping setting module 306 generates SSO mapping setting information 601 which is the fourth ID table associated with the generated AUIDs, and transmits the SSO mapping setting information 601 to the IdP.

According to the above processing, the fourth ID table (FIG. 6A) and the fifth ID table (FIG. 6B) are generated, and then the SSO mapping setting is finished.

In this SSO mapping setting, settings of AUIDs are also deleted following deletion or movement of the user ID. More specifically, when there are settings of SP User 1 and AUID 1 on the AUID mapping table, the settings of SP User 1 and AUID 1 are also deleted from the AUID mapping table following deletion of SP User 1.

In this application, an AUID may be set to each SP user at a stage at which an SP creates an SP user ID before an SSO mapping setting is requested to the SP.

When the AUID is set to each SP user before the SSO mapping setting is requested to the SP, the SP holds the table in which AUIDs are set to the SP user IDs.

Further, when the SP receives the SSO mapping setting request, the SSO mapping setting module 306 sets the AUID to each SP user ID in the second ID list using a table registered in advance.

Although the description has been made for the case where the processing in FIG. 7B is processed by one server, the processing in FIG. 7B may be realized using a system configured by a plurality of servers. When the system configured with a plurality of servers realizes the processing in FIG. 7B, each server has each module in FIG. 4A.

According to the present embodiment, it is possible to set SSO mapping to an SP ID which a user already has. Further, when an administrator serves as an agent to set SSO mapping in a tenant of a company, the administrator can serve as an agent to make an SSO mapping setting even if the agent does not know a password of each user. Further, even if a user with the same name is recreated after SSO mapping is set and after the user is deleted from an SSO target service, SSO mapping is not set by mistake.

FIG. 9 illustrates a screen example of an SSO mapping setting according to the embodiment of the present invention. In FIG. 9, an SP user ID and password, and the SSO mapping setting information 500 are received. In addition, although an IdP is also illustrated in the screen example since the SSO mapping target service is assumed to be the IdP, the SSO mapping target service is not limited to the IdP. Further, the SSO mapping setting information 500 may also be designated in a format other than a file.

In addition, although, in FIG. 7B of this application, an SP returns an error to an IdP when No is decided in step S1105, the IdP may be automatically registered. A method in which an SP automatically registers the IdP will be described using a table in FIG. 10A-10B and a flowchart in FIG. 11.

FIG. 10A illustrates a table which stores correspondences between SSO mapping target tenant IDs and IdPs in the SSO mapping service 300. This table is provided on the SSO mapping service side (SP side), and stores a tenant ID of the SSO mapping setting request and an IdP ID of the SSO mapping target. This correspondence is set prior to SSO mapping processing. In the case of FIG. 10A, the tenant A registered on the SP side corresponds to an IdP_A, and an IdP is not registered in the tenant B.

FIG. 10B illustrates a table which indicates a list of IdPs which can be automatically registered in the SSO mapping service 300. This table is provided on the SSO mapping service side (SP side). This list is set prior to the SSO mapping processing. In the case of FIG. 10B, the IdP_A and the IdP_B are IdPs which can be automatically registered.

Figure 11:
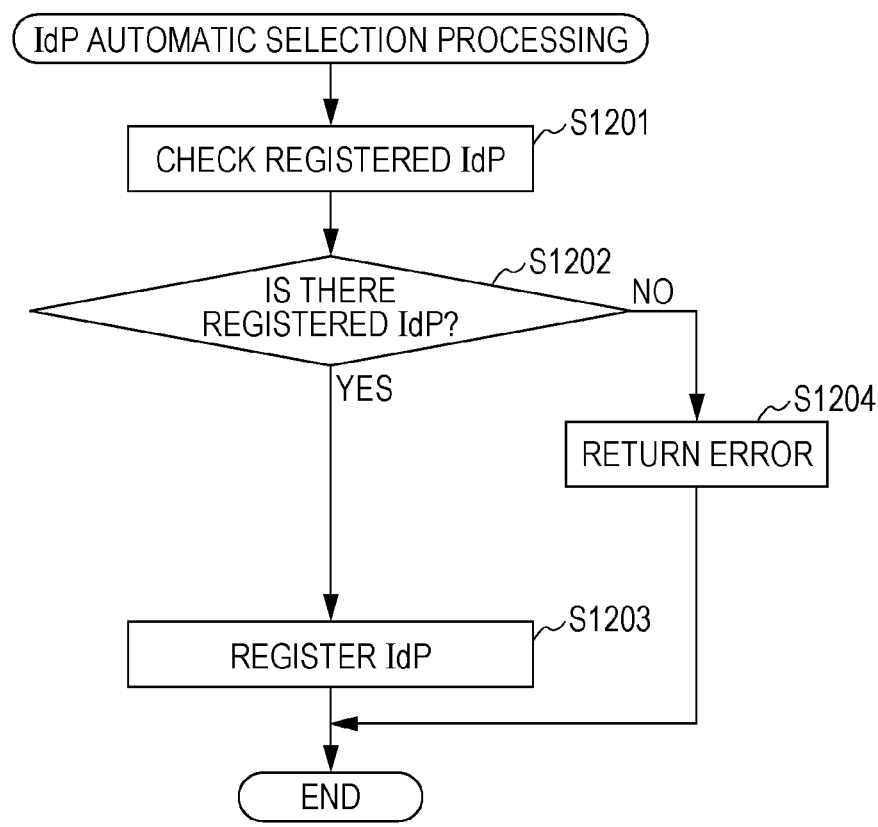
FIG. 11 is a flow for realizing automatic registration of IdPs.

FIG. 11 is a flowchart representing IdP automatic registration processing. When No is decided in step S1105 in FIG. 7B, the first authentication module starts the processing of this flowchart. In addition, to realize the processing in FIG. 11, IdP identification information also needs to be acquired in addition to the information described with reference to S1007.

In step S1201, the first authentication module refers to the list of IdPs which can be automatically registered in FIG. 10B.

Next, in step S1202, the first authentication module determines whether the IdP identification information is included in FIG. 10B. When the IdP identification information is not included, the first authentication module returns an error in step S1204.

When it is determined in step S1202 that the identification information is included, in step S1203, the first authentication module determines that the list of IdPs can be automatically registered, and registers the IdP identification information passed in step S1007 to the tenant ID. When, for example, the SSO mapping target tenant ID is the tenant B and the IdP_B is passed from the IdP as the IdP identification information in the status in FIG. 10A, the IdP_B is registered as the IdP associated with the tenant B in FIG. 10A.

Another Embodiment

Further, the present invention is also realized by executing following processing.

That is, the present invention is realized by processing of supplying software (program) which realizes the functions according to the above-described embodiments to a system or an apparatus through a network or various storage media and causing the system or the computer of the apparatus (or, for example, a CPU or a MPU) to read and execute a program.

According to the present invention, even when a user ID is deleted after SSO mapping is performed once and the same user ID is registered, it is possible to realize an adequate access.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-126189, filed Jun. 1, 2012, which is hereby incorporated by reference herein in its entirety.

What is claimed is:

1. An authentication system including a system which manages first user information and another system which manages second user information different from the first user information, the authentication system comprising:

a unique ID generation unit comprising logic configured to generate unique identification information to be associated with the received second user information, a receiver unit comprising logic configured to receive second user information desired to be associated with the first user information from the system; and a transmitting unit comprising logic configured to transmit a table which associates the received second user information and the unique identification information to the system;

a setting unit comprising logic configured to identify the unique identification information associated with the received second user information based on the table transmitted from the transmitting unit, and set SSO mapping by associated the first user information with the identified unique identification information, wherein the system is configured to provide a function of the system without performing user authentication in the system based on the set SSO mapping unique identification information.

2. The authentication system according to claim 1, further comprising a specifying unit comprising logic configured to specify a group to which a user of a user ID belongs, based on the user ID and a password received together with the user information.

3. The authentication system according to claim 2, wherein an authority of the user ID is specified, and the table which associates user information acquired by the authority from user information belonging to the specified group, and the unique identification information is transmitted.

4. A control method executed in an authentication system including a system which manages first user information and another system which manages second user information different from the first user information, the control method comprising:

receiving second user information desired to be associated with the first user information from the system; and generating unique identification information to be associated with the received second user information;

transmitting a table which associates the received second user information and the unique identification information to the system;

identifying the unique identification information associated with the received second user information based on the table transmitted from the transmitting unit; and setting SSO mapping by associating the first user information with the identified unique identification information, wherein, the system is configured to provide a function of the system without performing user authentication in the system based on the set SSO mapping.

5. The control method according to claim 4, further comprising specifying a group to which a user of a user ID belongs, based on the user ID and a password received together with the user information.

6. The control method according to claim 5, wherein an authority of the user ID is specified, and the table which associates user information acquired by the authority from user information belonging to the specified group, and the unique identification information is transmitted.

7. A non-transitory storage medium having a program recorded thereon which causes an authentication system including a system which manages first user information and another system which manages second user information different from the first user information to:

receive second user information desired to be associated with the first user information from the system; and generate unique identification information to be associated with the received second user information;

transmit a table which associates the received second user information and the unique identification information to the system;

identify the unique identification information associated with the received second user information based on the table transmitted from the transmitting unit; and set SSO mapping by associating the first user information with the identified unique identification information, wherein, the system is configured to provide a function of the system without performing user authentication in the system based on the set SSO mapping.

8. The non-transitory storage medium having the program recorded thereon according to claim 7, which further causes the system to specify a group to which a user of a user ID belongs, based on the user ID and a password received together with the user information.

9. The non-transitory storage medium having the program recorded thereon according to claim 8, wherein an authority of the user ID is specified, and the table which associates user information acquired by the authority from user information belonging to the specified group, with the unique identification information is transmitted.

* * * * *